(No Model.)
W. A. WILLINGHAM.
SPLIT PULLEY.
No. 396,637. Patented Jan. 22, 1889.
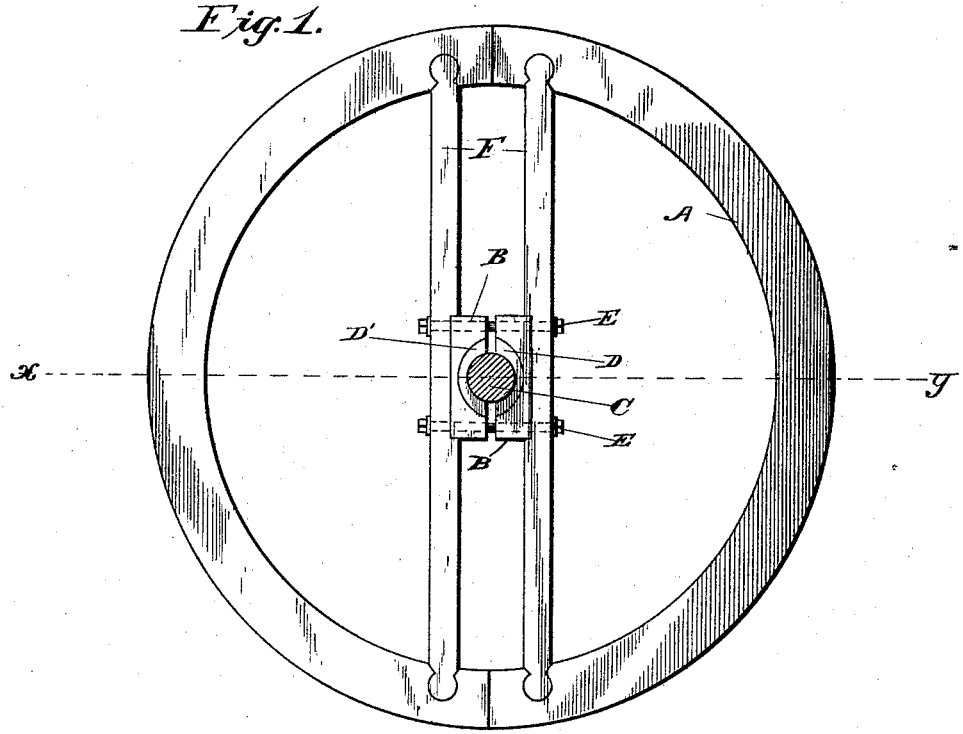
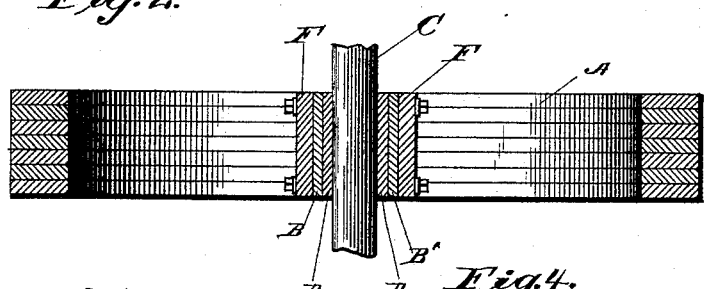
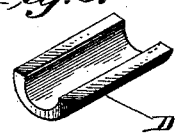 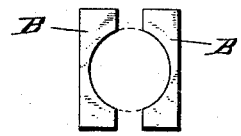
Witnesses.
Inventor,
William A. Willingham
By Lamar, Miles & Greene
Attorneys.

UNITED STATES PATENT OFFICE.

WILLIAM A. WILLINGHAM, OF CHATTANOOGA, TENNESSEE.

SPLIT PULLEY.

SPECIFICATION forming part of Letters Patent No. 396,637, dated January 22, 1889.

Application filed August 23, 1888. Serial No. 283,574. (No model.)

*To all whom it may concern:*

Be it known that I, WILLIAM A. WILLINGHAM, a resident of Chattanooga, in the county of Hamilton and State of Tennessee, have invented certain new and useful Improvements in Split Pulleys; and I do hereby declare the following to be a full, clear, and exact description of the invention, such as will enable others skilled in the art to which it pertains to make and use the same.

The object of this invention is the production of a split-pulley bushing that shall be incapable of rotation in its seat in the pulley, and that while requiring less labor and care in its construction than those now in use shall fit its seat with perfect accuracy.

In the accompanying drawings, Figure 1 is a side elevation of the pulley and bushing, a shaft being shown in section. Fig. 2 is a section on the line *x y*, Fig. 1. Fig. 3 shows one-half the bushing in perspective. Fig. 4 represents the parts of the hub separated, so that their inner cylindrical surfaces have the same axis.

In the drawings, A is the rim of a split pulley, and F are parallel arms upon each side of the pulley's center.

B are blocks fitting in slight recesses in the inner faces of the arms F, respectively, and together forming a separable pulley-hub.

D D' are halves of a bushing fitting recesses in the parts of the hub B and embracing the shaft C, to which the pulley is to be clamped. Bolts E, passing through the arms F and blocks B upon opposite sides of the shaft and beyond the limits of the bushing, serve to bind the pulley to the shaft.

The parts D D' occupy less than three hundred and sixty degrees, or the entire angular space about the shaft, and the thickness of the blocks B is so proportioned to the minimum distance between the arms that they can never meet. Consequently the entire force of the bolts E presses the bushing upon the shaft and secures the pulley firmly in place. Now the bushing-seat in the hub and the exterior convex face of the bushing are cut upon the arc of a circle, and the interior face of the bushing is cut upon the arc of a circle eccentric to the first, and hence the bushing is not of even thickness. It follows, then, that the bushing, when the parts are in place, cannot slip in its seat under the rotary force of the shaft. At the same time all the parts can be formed as readily as when the circles are concentric. The slipping thus avoided has heretofore been prevented by the clamping force of the bolts E, by making the exterior of the bushing and the seat non-circular, or by passing the bolts through the bushing. The first is inadequate, the second expensive, and the last unsatisfactory, because the bushing cannot be replaced without removing the bolts. It might be said that if the bolts secure the bushing against slipping on the shaft they at the same time must prevent its slipping in its seat. Experience shows that it is better to incur the expense of non-circular forms than to increase the points where slipping may occur, and few pulleys are made without any special device to overcome this evil.

Bushings of the form shown are readily turned and bored or cut with a suitable "former," as are also the seats in the hub. When the latter is bored, the parts are clamped in the relative position shown in Fig. 4. When the grooves have been cut by boring, the parts are brought nearer together, as shown in Fig. 1, so that the groove-surfaces, although strictly cylindrical in character, together form a sort of false ellipse.

The parts of the bushing are formed in an analogous way, so that externally the bushing appears to be of elliptical cross-section, while in fact its surfaces are parts of a cylindrical surface. As the parts are shown in Fig. 1, the axes of the hub-grooves are upon diametrically-opposite sides of the axis of the shaft, and each is equally distant from the lateral edges of each of the grooves.

What I claim is—

1. In a split pulley, a bushing made up of two slightly-separated parts, each having its external and its internal surface cylindrical, and each thinner in its middle than at either of its lateral edges, substantially as and for the purpose set forth.

2. In a split pulley, a hub composed of two slightly-separated parts having in their adjacent faces registering bushing-grooves whose curved surfaces are portions of cylinders of a diameter greater than the greatest distance between those surfaces.

In testimony whereof I have signed this specification in the presence of two subscribing witnesses.

WILLIAM A. WILLINGHAM.

Witnesses:
O. M. HAMILTON,
J. W. STURGIS.